United States Patent

[11] 3,564,245

[72] Inventor Dale R. Koehler
 River Vale, N.J.
[21] Appl. No. 700,102
[22] Filed Jan. 24, 1968
[45] Patented Feb. 16, 1971
[73] Assignee Bulova Watch Company, Inc.
 New York, N.Y.

[54] INTEGRATED CIRCUIT MULTI-CELL P-N JUNCTION RADIATION DETECTORS WITH DIODES TO REDUCE CAPACITANCE OF NETWORKS
 12 Claims, 5 Drawing Figs.
[52] U.S. Cl. ............................................. 250/83,
 250/83.3, 250/211, 317/235
[51] Int. Cl. ........................................ H01p 15/06
[50] Field of Search .......................... 250/211,
 83, 83.3; 317/235, 27

[56] References Cited
UNITED STATES PATENTS
2,892,094  6/1959  Lehovec ................. 250/211
2,911,539  11/1959  Tanenbaum ............. 250/211
3,020,412  2/1962  Byczkowski ............. 250/211
3,079,512  2/1963  Rutz ....................... 250/211

Primary Examiner—Archie R. Borchelt
Assistant Examiner—Martin Abramson
Attorney—Michael Ebert ABSTRACT: A multicellular, solid-state radiation detector assembly adapted to produce exceptionally large signals in response to incident radiation, the detector being constituted by an array of individual surface-barrier or diffused-junction, radiation-sensitive, semiconductive cells, each of which has a small area and a low internal capacitance. The cells in the array are unidirectionally connected in parallel relation with respect to current flow, but are otherwise electrically isolated from each other, whereby the overall capacitance of the array is low while the detection efficiency thereof is substantially equal to a unitary radiation detector whose surface area is equivalent to the aggregate area of the cells, the signal output from the multicellular detector being far greater than that yielded by the unitary detector.

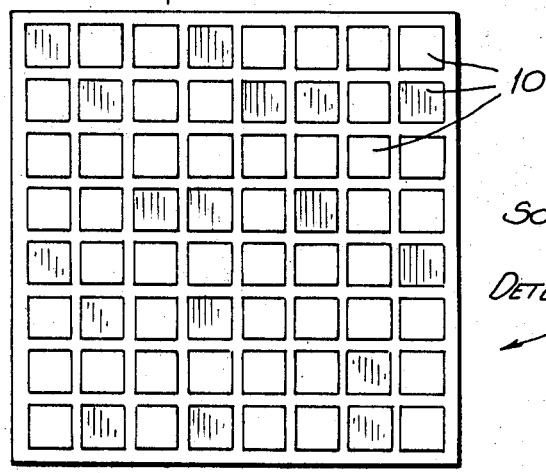
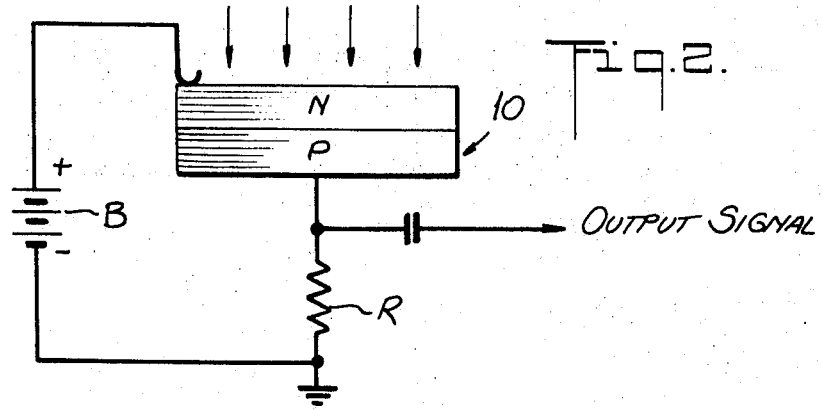
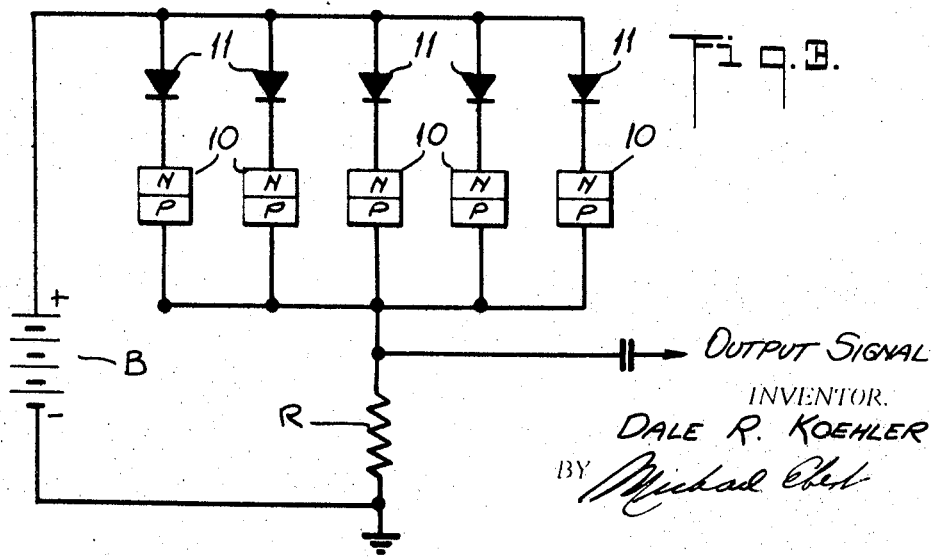

INVENTOR.
DALE R. KOEHLER
ATTORNEY

INTEGRATED CIRCUIT MULTI-CELL P-N JUNCTION RADIATION DETECTORS WITH DIODES TO REDUCE CAPACITANCE OF NETWORKS

This invention relates generally to the detection of nuclear radiation such as protons, alpha, beta and other charged particles, and more particularly to a multicellular solid-state radiation detector assembly of exceptionally high sensitivity.

For the most part, existing radiation detectors depend for their operation on ionization effects produced therein by the passage of charged particles. One of the oldest but still the most widely used form of radiation detector makes use of a gas-filled chamber. Depending on the mode of operation, this type of radiation detector is known either as an ionization chamber, a proportional counter, or as a Geiger-Muller tube.

This gas-filled chamber includes a central electrode mounted within an electrically-conductive tubular electrode formed on the wall of the chamber, a high voltage being impressed across these electrodes to establish an electric field within the chamber. The passage of nuclear particles releases ion pairs within the chamber, the positive and negative charges migrating toward the chamber wall and the central electrode, respectively, and giving rise to current pulses in the associated circuit.

The selected operating region in the curve representative of pulse height (number of ions collected) versus applied voltage, determines the mode of operation of the gas-filled chamber. Thus when acting in the saturation region, which is low on the curve, the device functions as an ionization chamber. In the proportional region, which is higher on the curve, the collected charge is increased by a factor $M$ through the phenomenon of gas multiplication. In gas multiplication, electrons which are released in the primary ionization are accelerated sufficiently to produce additional ionization and thus add to the collected charge. At the onset of this region, the multiplication for a given applied voltage is independent of the initial ionization, thus preserving the proportionality of pulse sizes. This strict proportionality breaks down with increases in applied voltage. Gas-filled chambers operating in the proportional region are known as proportional counters.

The gas-filled chamber functions as a Geiger-Muller tube in a still higher region on the curve, in which region gas multiplication increases the charge to a value that is limited by the characteristics of the chamber and the external circuit.

Ionization chambers may be used in nonpulse type applications, such as for monitoring radiation. In the saturation region in which ionization chambers operate, a small-size pulse is released by an individual nuclear particle, hence ionization chambers are not effective for pulse-type operation, except in conjunction with high-gain amplifiers. But proportional counters are useful as counting devices and for energy measurements, with the ability to discriminate between particles producing different amounts of ionization. G-M counters are useful for counting electrons and gamma rays, inasmuch as a large discharge pulse is triggered by the very small ionization which these particles produce. It is important to note that gas-filled chambers operating as proportional counters or G-M tubes, require operating voltages in the range of 200 to 1000 volts.

The most recently developed type of nuclear radiation detection device is commonly referred to as a solid-state radiation detector. This term is applied to a reverse-biased, surface-barrier or PN junction type of semiconductor element, which when exposed to radiation breaks down and passes electrical pulses whose amplitude is a function of the energy level of incident radiation. A detailed description of such detectors and their characteristics may be found in the text, "Nuclear Radiation Detection," by W.J. Price, MC-Graw-Hill Book Co., Inc. 1964, and the references included therein.

In the solid-state radiation detector, an electric field is set up across a low-conductivity region, which region is the charge depletion layer at the diode junction operating at reverse bias. When a charged particle passes through the semiconductive medium, electron hole pairs are produced therein. These charges are caused to separate by the electric field and the resultant electrical signal can be transmitted to a measuring system to afford useful information respecting the particles detected.

The solid-state radiation detector has several key properties, the combination of which accounts for the rapid rise in the importance of such detectors and the increasing use being made thereof in spectrometry and in many other applications, such as those set forth in the copending application Ser. No. 651,864, identified above. These properties include linearity of pulse height versus energy, rapid response time, high resolution and insensitivity to magnetic fields. Moreover, the solid-state detector is inexpensive and has small dimensions relative to ionization chambers and operates at relatively low voltages. Hence it lends itself to applications where space is at a premium and which preclude the use of gas chambers.

The principal drawback in existing solid-state detectors is that their sensitivity, especially to low-energy particles, tends to be very low. This low sensitivity dictates the use of high-gain amplifiers. However, the output signal from a conventional solid-state radiation detector lies in the millivolt range and is not much more pronounced in amplitude than the noise level in the associated electronic amplifying circuits for elevating the signal to a level suitable for measurement and analysis. This noise may give rise to spurious signals which cannot readily be distinguished from the radiation signals, thus adversely affecting the sensitivity and energy resolution of the detection system.

While attempts have been made to overcome this drawback, as by the use of parametric or other high-gain amplifiers having sharply reduced noise levels, such amplifiers are of elaborate design and relatively costly.

Accordingly, it is the main object of my invention to provide a highly efficient solid-state radiation detector assembly whose signal output is far greater than is obtainable with conventional detectors.

More specifically, it is an object of my invention to provide a multicellular solid-state detector assembly having a large overall surface area and a consequent high degree of detection efficiency, the net capacitance of the detector being relatively small, whereby the signal output, which tends to decrease with large capacitance values, is far greater than is obtainable with conventional detectors having similar surface dimensions but much larger capacitance values.

Still another object of my invention is to provide a multicellular, solid-state detector assembly formed by an array of semiconductive, radiation-sensitive elements in combination with isolating diodes in a circuit acting to reduce the effective capacitance of the array while producing a large collective signal output.

Yet another object of the invention is to provide a microcircuit layout which incorporates an array of semiconductive cells in combination with diodes to form a solid-state detector.

Briefly stated, these objects are accomplished in a solid-state radiation detector assembly formed by an array of semiconductive surface-barrier or diffused-junction cells, each of which has a small area and a low internal capacitance, the cells in the array being unidirectionally connected in parallel relation with respect to current flow by an equal number of diodes which are arranged to otherwise isolate the cells from each other, whereby the overall capacitance of the parallel cells is low while the detection efficiency thereof is substantially equal to that of a unitary detector whose surface area is equivalent to the aggregate area of the cells, the signal output of the array being far greater than that yielded by the unitary detector.

For a better understanding of the invention, as well as other objects and further features thereof, reference is made to the following detailed description to be read in conjunction with the accompanying drawing, wherein:

FIG. 1 is a plan view of a multicellular, solid-state radiation detector assembly made in accordance with my invention;

FIG. 2 is a schematic diagram of an individual cell and an associated output circuit;

Figure 5:
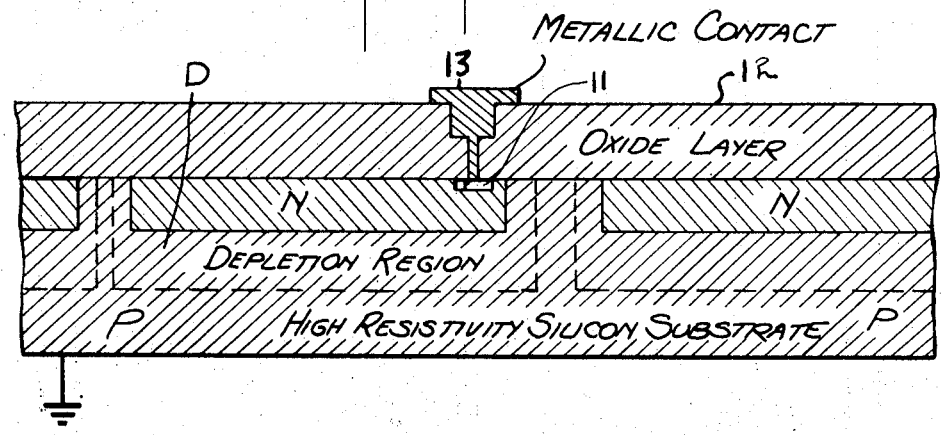
Figure 4:
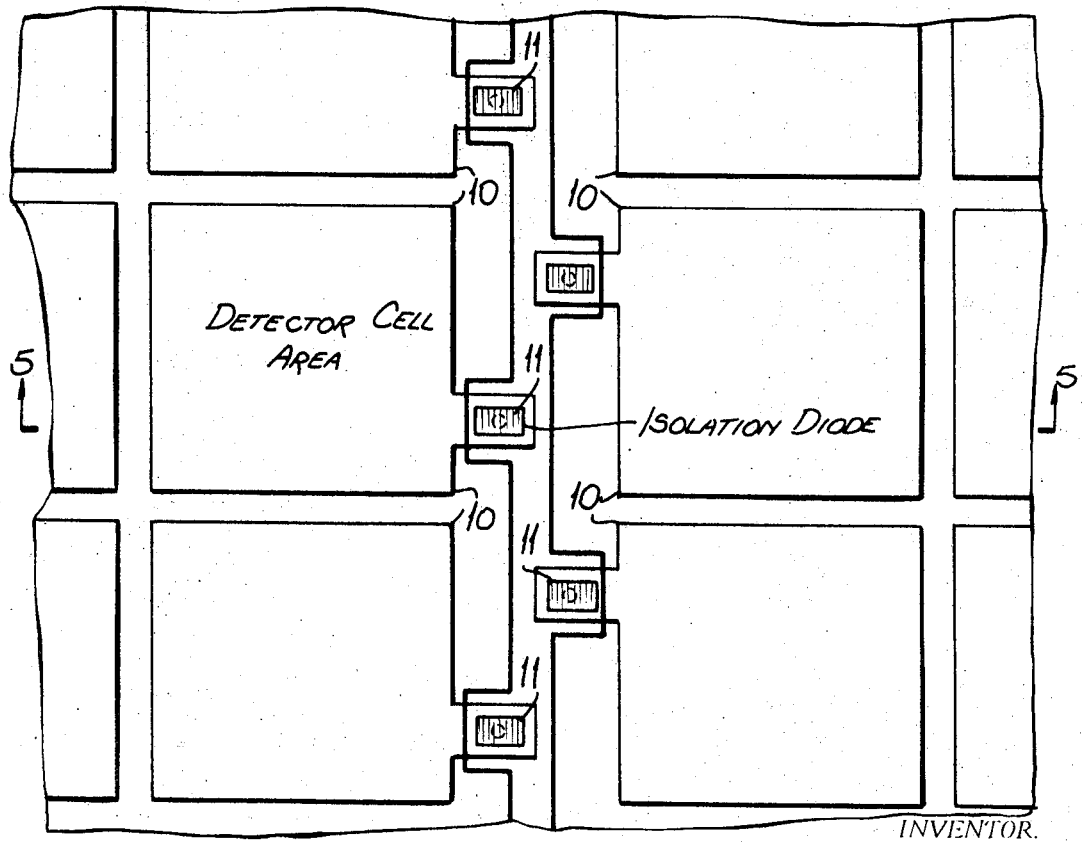

FIG. 3 schematically illustrates the electrical circuit of the multicellular detector assembly;

FIG. 4 is a plan view of a microcircuit layout for a multicellular radiation detector in accordance with the invention; and FIG. 5 is a section taken through the layout along the plane indicated by line 5-5 in FIG. 4.

As is evident from the preceding analysis of ionization chambers and solid-state radiation detectors of the surface-barrier or diffused-junction type, the primary distinction between these devices resides in the nature of the radiation-sensitive volume, the chamber making use of a gaseous medium and the solid-state detectors, a semiconductive solid medium. In both instances, the charged ions and associated free electrons liberated by the radiation impinging on the detector are swept out of the sensitive volume by an applied electric field. The motion of these charges constitutes an electric current flowing in the detector and consequently a current or voltage pulse is seen in the external circuit while the charges are moving.

An ionization chamber which has a wall electrode and a central electrode spaced therefrom by a dielectric gaseous medium, may be regarded as a capacitor. The magnitude of the voltage pulses $\Delta V_o$ generated by the chamber, can be calculated by the equation:

$$\Delta V_o = \frac{Q}{C} \tag{1}$$

wherein $Q$ is the amount of charge liberated by the ionizing particle, and $C$ is the capacitance of the ionization-chamber radiation detector.

Formulae are available for calculating the capacitance of a large number of geometrical shapes of conducting surfaces, such as spheres and cylinders, either separated or concentric. The usual type of capacitor calculations are concerned with two or more flat conductors. When two or more conducting plates are closely parallel and of large area, the equation for capacitance is:

$$C = 0.0885 \times \frac{KS}{t} \tag{2}$$

wherein:
 $C =$ capacitance in $\mu\mu$f
 $K =$ dielectric constant (air $= 1$)
 $S =$ area of one plate, sq.cm.
 $t =$ distance between plates, cm.

While an ionization chamber does not strictly fall within this equation, its capacitance is nevertheless directly proportional to the electrode area of the chamber and inversely proportional to the distance between the electrodes. For solid-state detectors, the geometry is closer to that of parallel conducting plates, and equation (2) is more directly applicable thereto.

For a junction or surface-barrier device, this interplate distance is associated with the depletion layer. The width of the depletion layer is proportional to the square root of the resistivity of the semiconductor material and to the square root of the magnitude of the applied bias voltage. Hence this distance can be controlled to a minor degree by varying the magnitude of the applied reverse bias voltage. But there are distinct practical limits on the amount of capacitance change which can be so effected.

It will be evident from equation (1) that the smaller the capacitance of the solid-state detector, the greater the magnitude of output voltage for a given amount of charge. On the other hand, while a large surface area produces a larger capacitance and hence a smaller output voltage, a large surface area is advantageous from the standpoint of detection efficiency, for it permits a large area of semiconductor to be exposed to incident radiation.

As shown in FIG. 1, the solid-state detector assembly in accordance with the invention is constituted by a planar array of identical square cells 10 which by way of example only, are 64 in number, the array being composed of eight parallel rows, with eight cells in each row. Each cell 10 is an individual solid-state radiation-sensitive element. It may be a semiconductive element having a PN junction and an external circuit that is reverse-biased by a battery B or other DC source with respect to the junction. Incident radiation, indicated schematically by the arrows, falls on the N-type surface, the current pulse produced across the PN junction flowing through a load resistor R to yield an output signal.

While the PN junction may be made in many ways, it has been found that forming the PN junction, whose depletion region extends from within a micron of the N-surface, to at least a depth equal to the penetration range in the incident particle in the semiconductor crystal, is of particular advantage in achieving a high resolution of current pulse due to incident radiation. In making this preferred form of junction, a P-type silicon material having a high resistivity (i.e., 1000 ohm — cm. and higher) is prepared. An N-type surface region is formed by diffusing phosphorous, an N-type impurity material, into the crystal. A doped N-type region is preferably produced in the crystal of about 1 micron thickness. A detailed description of how to make such solid-state detectors is found in "Nucleonics," Feb. 1960, Volume 18, No. 2., in the article, "Tiny Semiconductor Is Fast Linear Detector."

Each cell 10 in the array thereof is very tiny and has a small internal capacitance. To produce a multicellular detector having a high order of resistivity, the cells 10 in the array, only five of which are shown in FIG. 3, are all connected in parallel relation, a diode 11 being interposed in series with each cell in the parallel circuit.

The cells are, with respect to output current flow, unidirectionally connected by the diodes in shunt relation to output resistor R, so that the resultant output pulse is the collective result of current flow through all of the cells in the array in response to incident radiation. However, each cell is electrically isolated with respect to every other cell, for the path between any two adjacent cells is formed by two diodes in series opposition, and hence is effectively an open circuit. Consequently, the overall capacitance of the array of parallel cells is not a multiple of the capacitances of the individual cells, but is closer in value to that of a single cell.

The resultant voltage increase in the radiation detector signal is given by the following equation for the voltage $\Delta V_1$ produced by the multicellular detector:

$$\Delta V_1 = \frac{Q}{C_o} = \frac{Q}{C/n} = n \cdot \Delta V_o \tag{3}$$

wherein:
 $C$ is the capacitance of a standard unitary solid-state detector whose effective surface area is equal to the aggregate areas of the cells in the multicellular radiation detector.
 $C_o$ is the capacitance of an individual cell.
 $n$ is the number of cells.

It will be appreciated from equation (3), that the voltage output of the multicellular radiation detector is far greater than that produced by a standard unitary solid-state detector of the same effective surface area. Nevertheless, the detection efficiency of the multicellular detector is as good as that of the unitary detector, for the area exposed to incident radiation is as great.

Thus if a unitary solid-state detector has a surface area of 0.5 cm.$^2$, by the use of known microcircuit techniques, one can without difficulty, make a multicellular detection array essentially of the same net area, in which $n$ is in the order of 1000. Therefore a thousandfold increase in signal voltage can be attained without the use of an amplifier. A further improvement gained in obviating the need for an amplifier, is that volume-generated noise in the detector is not magnified along with the signal and an enormously improved signal-to-noise ratio is obtained.

It will be recognized that various possibilities exist for the design of a microcircuit structure incorporating a multicellular detector and an isolation diode assembly. Preferably, the design should be such as to shield the isolation diodes from incident radiation either by a suitable mark or by appropriate mounting in the detector housing.

Referring now to FIGS. 4 and 5, there is shown a preferred form of microcircuit layout in which a planar array of semiconductive radiation-sensitive cells 10 is combined with isolating diodes to form a radiation detector assembly of the type shown schematically in FIG. 3.

To fabricate a detector of this type, an N-type dopant is diffused into a high-resistivity P-type silicon wafer through an appropriately designed mask to produce the desired detector cell geometry. The depletion region D, as indicated by dashed lines in FIG. 4, or sensitive volume of the individual cells, is generated in the P-type substrate, the intercell spacing being such that adjacent depletion regions do not overlap. A smaller P-type zone constituting the isolation diode 11 is then diffused into the N-type material. The N-type region therefore serves as a common junction material for the radiation detector cell 10 and the isolation diode 11.

A protective oxide layer 12 is then formed over the entire surface of the structure, the depth of the layer being sufficiently thin to cause negligible absorption of the incoming radiation. A metallic contact 13 is provided, the contact penetrating the oxide layer to engage the P-type region of the isolation diode. The head of the contact is made broad to shield the underlying isolation diode junctions from radiation, thereby eliminating complications arising from impinging radiation.

While there has been shown and described a preferred embodiment of multicellular solid-state detector assembly in accordance with the invention, it will be appreciated that many changes and modifications may be made therewith without, however, departing from the essential spirit of the invention as defined in the annexed claims.

Thus the use of the invention is not limited to the detection of radiation of nuclear origin, for as pointed out in the above-cited W.J. Price text, a solid-state radiation detector is also sensitive to light. Because of its voltage enhancement characteristic, the multicellular solid-state radiation detector in accordance with the invention is therefore superior to a conventional unitary cell when used to detect light pulses from a scintillator.

I claim:

1. A multicellular solid-state nuclear radiation detector assembly comprising:
   a. an array of radiation-sensitive semiconductor cells each of which has a relatively small surface area and a low internal capacitance;
   b. a plurality of unidirectional elements equal in number to said cells; and
   c. means connecting said cells in parallel relation through a common output resistor to an output circuit imposing a reverse bias thereon, each unidirectional element being interposed in series with a respective cell to effect unidirectional coupling thereof with respect to current flow in said output circuit, whereby unidirectional currents flowing through the cells in the array are caused to flow in parallel relation through said common resistor to provide a combined output voltage, the cells otherwise being effectively isolated from each other by said elements, whereby the net capacitance of said parallel cells is low, whereas the combined output voltage produced thereby is high.

2. An assembly as set forth in claim 1, wherein said cells are of the surface-barrier type.

3. An assembly as set forth in claim 1, wherein said cells are of the diffused-junction type.

4. An assembly as set forth in claim 1, wherein said cells are disposed in a planar array and have a net detection efficiency substantially equal to that of a unitary detector of the same material whose surface area is equivalent to the aggregate surface areas of the cells.

5. An assembly as set forth in claim 1, wherein said unidirectional elements are constituted by N-P diodes.

6. An assembly as set forth in claim 1, wherein said cells are exposed to radiation and said unidirectional elements are shielded therefrom.

7. A microcircuit layout for a multicellular solid-state nuclear radiation detector assembly, said layout comprising:
   a. a P-Type base layer;
   b. an array of relatively small N-type areas diffused into said base layer to form therewith a plurality of electrically isolated semiconductive radiation-sensitive cells, each having a separate depletion region which is spaced from the regions of adjacent cells; and
   c. a still smaller P-type zone diffused into each of said N-type areas to form a diode therewith, said N-type area serving as a common junction for said cell and said diode.

8. A layout as set forth in claim 7, wherein said P-type base layer is a silicon wafer.

9. A layout as set forth in claim 7, wherein the surface of the structure is coated with a protective oxide layer.

10. A layer as set forth in claim 9, further including a terminal contact penetrating said oxide layer and engaging said zone, said contact having an enlarged head to shield said zone.

11. A microcircuit layout for a multicellular solid-state nuclear radiation detector assembly, said layout comprising:
   a. an N-type base layer;
   b. an array of relatively small P-type areas diffused into said base layer to form therewith a plurality of electrically isolated semiconductive radiation-sensitive cells, each having a separate depletion region which is spaced from the regions of adjacent cells; and
   c. a still smaller N-type zone diffused into each of said P-type areas to form a diode therewith, said P-type area serving as a common junction for said cell and said diode.

12. A detector assembly as set forth in claim 1, wherein said unidirectional elements are constituted by diodes each having an internal capacitance which is relatively small compared to that of said semiconductor cell.